(12) United States Patent
Burkard et al.

(10) Patent No.: US 9,141,722 B2
(45) Date of Patent: Sep. 22, 2015

(54) ACCESS TO NETWORK CONTENT

(71) Applicant: Google Inc., Mountain View, CA (US)

(72) Inventors: Timo Burkard, San Francisco, CA (US); Arvind Jain, Los Altos, CA (US)

(73) Assignee: Google Inc., Mountain View, CA (US)

( * ) Notice: Subject to any disclaimer, the term of this patent is extended or adjusted under 35 U.S.C. 154(b) by 225 days.

(21) Appl. No.: 13/633,431

(22) Filed: Oct. 2, 2012

(65) Prior Publication Data

US 2014/0095966 A1  Apr. 3, 2014

(51) Int. Cl.
*G06F 17/00* (2006.01)
*G06F 17/30* (2006.01)

(52) U.S. Cl.
CPC .... *G06F 17/30902* (2013.01); *G06F 17/30899* (2013.01)

(58) Field of Classification Search
CPC ............ G06F 17/2235; G06F 17/3089; G06F 17/30899; G06F 17/30902; G06F 17/30014
USPC .......................................... 715/200, 205, 208
See application file for complete search history.

(56) References Cited

U.S. PATENT DOCUMENTS

| | | | |
|---|---|---|---|
| 5,715,445 A | 2/1998 | Wolfe | |
| 5,727,129 A | 3/1998 | Barrett et al. | |
| 5,946,682 A | 8/1999 | Wolfe | |
| 6,055,569 A | 4/2000 | O'Brien et al. | |
| 6,098,064 A | 8/2000 | Pirolli et al. | |
| 6,100,871 A | 8/2000 | Min | |
| 6,151,603 A | 11/2000 | Wolfe | |
| 6,182,133 B1 | 1/2001 | Horvitz | |
| 6,256,712 B1 | 7/2001 | Challenger et al. | |
| 6,301,576 B1 | 10/2001 | Wolfe | |
| 6,467,029 B1 | 10/2002 | Kitayama | |
| 6,604,103 B1 | 8/2003 | Wolfe | |

(Continued)

FOREIGN PATENT DOCUMENTS

| | | |
|---|---|---|
| JP | 2004536389 A | 12/2004 |
| KR | 20070101237 A | 10/2007 |

(Continued)

OTHER PUBLICATIONS

Christopher Schmitt, "CSS Cookbook, Third Edition," O'Reilly Media, Dec. 24, 2009, pp. 1, 33, 35 and 217-219.

(Continued)

*Primary Examiner* — Stephen Hong
*Assistant Examiner* — Gregory J Vaughn
(74) *Attorney, Agent, or Firm* — Lerner, David, Littenberg, Krumholz & Mentlik, LLP

(57) ABSTRACT

A method and system for improving access to network content are described. Aspects of the disclosure minimize the delay between a navigation event and a network response by prerendering the next navigation event. For example, the method and system may predict a likely next navigation event during web browsing to preemptively request content from the network before the user selects the corresponding link on a web page. The prediction operation may identify correlations between metadata associated with a navigation history. The metadata may include the relationship of the selected navigation events to a web page. By making predictions using link page relationships links may be accurately predicted in circumstances where two links share common relationships to their source page but different destination addresses.

13 Claims, 11 Drawing Sheets

(56) References Cited

U.S. PATENT DOCUMENTS

| | | | |
|---|---|---|---|
| 6,976,090 B2 | 12/2005 | Ben-Shaul et al. | |
| 7,047,502 B2 | 5/2006 | Petropoulos et al. | |
| 7,103,594 B1 | 9/2006 | Wolfe | |
| 7,155,336 B2 | 12/2006 | Dorfman et al. | |
| 7,277,924 B1 | 10/2007 | Wichmann et al. | |
| 7,428,701 B1 | 9/2008 | Gavin et al. | |
| 7,467,137 B1 | 12/2008 | Wolfe | |
| 7,480,669 B2 | 1/2009 | Lo et al. | |
| 7,487,147 B2 | 2/2009 | Bates et al. | |
| 7,499,940 B1 | 3/2009 | Gibbs | |
| 7,536,635 B2 | 5/2009 | Racovolis et al. | |
| 7,562,115 B2 * | 7/2009 | Zircher et al. | 709/204 |
| 7,613,712 B2 | 11/2009 | Greenblatt et al. | |
| 7,631,032 B1 | 12/2009 | Refuah et al. | |
| 7,660,815 B1 | 2/2010 | Scofield et al. | |
| 7,685,192 B1 * | 3/2010 | Scofield et al. | 707/709 |
| 7,716,332 B1 | 5/2010 | Topfl et al. | |
| 7,747,749 B1 | 6/2010 | Erikson et al. | |
| 7,802,305 B1 | 9/2010 | Leeds | |
| 7,805,673 B2 | 9/2010 | der Quaeler et al. | |
| 7,840,589 B1 | 11/2010 | Holt et al. | |
| 7,876,335 B1 | 1/2011 | Pittenger et al. | |
| 7,908,336 B2 | 3/2011 | Carlson et al. | |
| 8,112,308 B1 | 2/2012 | Ho et al. | |
| 8,260,938 B2 | 9/2012 | Gupta et al. | |
| 8,356,247 B2 | 1/2013 | Krassner et al. | |
| 8,386,509 B1 * | 2/2013 | Scofield et al. | 707/769 |
| 8,391,461 B2 | 3/2013 | Skakkebaek et al. | |
| 8,402,481 B1 | 3/2013 | Urbach | |
| 8,504,907 B2 | 8/2013 | Piersol | |
| 8,549,497 B2 * | 10/2013 | Ghorbani et al. | 717/148 |
| 8,600,968 B2 | 12/2013 | Holenstein et al. | |
| 8,892,638 B2 * | 11/2014 | Chang et al. | 709/203 |
| 2002/0075333 A1 | 6/2002 | Dutta et al. | |
| 2003/0005038 A1 | 1/2003 | Codella et al. | |
| 2003/0050906 A1 | 3/2003 | Clifton-Bligh | |
| 2003/0061451 A1 | 3/2003 | Beyda | |
| 2003/0088573 A1 * | 5/2003 | Stickler | 707/100 |
| 2003/0088580 A1 | 5/2003 | Desai et al. | |
| 2003/0182390 A1 | 9/2003 | Alam | |
| 2003/0193994 A1 * | 10/2003 | Stickler | 375/150 |
| 2003/0212760 A1 | 11/2003 | Chen et al. | |
| 2004/0031052 A1 * | 2/2004 | Wannamaker et al. | 725/61 |
| 2004/0267600 A1 | 12/2004 | Horvitz | |
| 2004/0268228 A1 | 12/2004 | Croney et al. | |
| 2005/0055426 A1 | 3/2005 | Smith et al. | |
| 2005/0132296 A1 | 6/2005 | Milic-Frayling et al. | |
| 2005/0240576 A1 | 10/2005 | Piscitello et al. | |
| 2005/0251396 A1 | 11/2005 | Tyler | |
| 2006/0047804 A1 | 3/2006 | Fredricksen et al. | |
| 2006/0055696 A1 | 3/2006 | Loberg | |
| 2006/0064411 A1 | 3/2006 | Gross et al. | |
| 2006/0143568 A1 | 6/2006 | Milener et al. | |
| 2006/0282771 A1 | 12/2006 | Vinci | |
| 2007/0005425 A1 | 1/2007 | Bennett et al. | |
| 2007/0198634 A1 | 8/2007 | Knowles et al. | |
| 2007/0204057 A1 | 8/2007 | Shaver et al. | |
| 2007/0208704 A1 | 9/2007 | Ives | |
| 2007/0220010 A1 | 9/2007 | Ertugrul | |
| 2007/0226633 A1 | 9/2007 | Lyle et al. | |
| 2007/0260585 A1 | 11/2007 | Bodine et al. | |
| 2007/0288648 A1 | 12/2007 | Mehanna et al. | |
| 2008/0052219 A1 | 2/2008 | Sandholm et al. | |
| 2008/0104407 A1 | 5/2008 | Horne et al. | |
| 2008/0140941 A1 | 6/2008 | Dasgupta et al. | |
| 2008/0201332 A1 | 8/2008 | Souders et al. | |
| 2008/0208789 A1 | 8/2008 | Almog | |
| 2008/0249969 A1 | 10/2008 | Tsui et al. | |
| 2008/0256134 A1 | 10/2008 | Bogner et al. | |
| 2008/0295006 A1 | 11/2008 | LuVogt et al. | |
| 2008/0320222 A1 | 12/2008 | Dhodapkar | |
| 2009/0013006 A1 | 1/2009 | Friedl et al. | |
| 2009/0070392 A1 | 3/2009 | Le Roy et al. | |
| 2009/0094196 A1 | 4/2009 | Piwowarski et al. | |
| 2009/0106349 A1 | 4/2009 | Harris | |
| 2009/0132949 A1 | 5/2009 | Bosarge | |
| 2009/0158221 A1 | 6/2009 | Nielsen et al. | |
| 2009/0171930 A1 | 7/2009 | Vaughan et al. | |
| 2009/0210806 A1 | 8/2009 | Dodson et al. | |
| 2009/0216639 A1 | 8/2009 | Kapczynski et al. | |
| 2009/0254515 A1 * | 10/2009 | Terheggen et al. | 707/2 |
| 2009/0254643 A1 * | 10/2009 | Terheggen et al. | 709/223 |
| 2009/0265774 A1 | 10/2009 | Malik et al. | |
| 2009/0299964 A1 | 12/2009 | Cameron et al. | |
| 2009/0327260 A1 | 12/2009 | Li et al. | |
| 2009/0327424 A1 | 12/2009 | Bernstein et al. | |
| 2010/0005061 A1 | 1/2010 | Basco et al. | |
| 2010/0023581 A1 | 1/2010 | Lahav | |
| 2010/0031366 A1 | 2/2010 | Knight et al. | |
| 2010/0107115 A1 | 4/2010 | Sareen et al. | |
| 2010/0131902 A1 | 5/2010 | Teran et al. | |
| 2010/0191856 A1 | 7/2010 | Gupta et al. | |
| 2010/0251116 A1 | 9/2010 | Rimas-Ribikauskas et al. | |
| 2010/0306665 A1 | 12/2010 | Milic-Frayling et al. | |
| 2010/0312858 A1 | 12/2010 | Mickens et al. | |
| 2011/0029518 A1 | 2/2011 | Tong | |
| 2011/0029670 A1 | 2/2011 | Klein et al. | |
| 2011/0066732 A1 | 3/2011 | Iwade et al. | |
| 2011/0119361 A1 | 5/2011 | Issa et al. | |
| 2011/0173569 A1 | 7/2011 | Howes et al. | |
| 2011/0199304 A1 | 8/2011 | Walley et al. | |
| 2011/0225494 A1 | 9/2011 | Shmuylovich et al. | |
| 2011/0289317 A1 | 11/2011 | Darapu et al. | |
| 2012/0017146 A1 | 1/2012 | Travieso et al. | |
| 2012/0059911 A1 | 3/2012 | Randhawa et al. | |
| 2012/0084644 A1 | 4/2012 | Robert et al. | |
| 2012/0110435 A1 | 5/2012 | Green | |
| 2012/0137201 A1 | 5/2012 | White et al. | |
| 2012/0151308 A1 | 6/2012 | Falkenberg et al. | |
| 2012/0158740 A1 | 6/2012 | Smola et al. | |
| 2012/0254721 A1 | 10/2012 | Jain et al. | |
| 2012/0254727 A1 | 10/2012 | Jain et al. | |
| 2012/0290924 A1 | 11/2012 | Vick et al. | |
| 2012/0324043 A1 | 12/2012 | Burkard et al. | |

FOREIGN PATENT DOCUMENTS

| | | |
|---|---|---|
| KR | 20080111822 | 12/2008 |
| KR | 20100102858 A | 9/2010 |
| KR | 20100112512 | 10/2010 |
| WO | 9936867 A1 | 7/1999 |

OTHER PUBLICATIONS

U.S. Appl. No. 13/175,067, filed Jul. 1, 2011.
U.S. Appl. No. 13/100,615, filed May 4, 2011.
U.S. Appl. No. 13/174,928, filed Jul. 1, 2011.
U.S. Appl. No. 13/174,925, filed Jul. 1, 2011.
U.S. Appl. No. 13/175,115, filed Jul. 1, 2011.
U.S. Appl. No. 13/182,920, filed Jul. 14, 2011.
U.S. Appl. No. 13/183,824, filed Jul. 15, 2011.
U.S. Appl. No. 13/233,300, filed Sep. 15, 2011.
U.S. Appl. No. 13/233,314, filed Sep. 15, 2011.
U.S. Appl. No. 13/268,279, filed Oct. 7, 2011.
U.S. Appl. No. 13/308,757, filed Dec. 1, 2011.
U.S. Appl. No. 13/353,626, filed Jan. 19, 2012.
U.S. Appl. No. 13/472,019, filed May 15, 2012.
International Search Report and Written Opinion for Application No. PCT/US2012/055473 dated Feb. 26, 2013.
International Search Report and Written Opinion for Application No. PCT/US2012/042186 dated Feb. 20, 2013.
International Search Report & Written Opinion dated May 7, 2013 for Application No. PCT/US2013/021927.
International Search Report dated Nov. 28, 2012, in International Application No. PCT/US2012/036519.
International Search Report and Written Opinion dated Dec. 14, 2012 for PCT application US2012044896.
International Search Report and Written Opinion for Application No. PCT/US2013/062245 dated Jan. 28, 2014.

(56) References Cited

OTHER PUBLICATIONS

StackOverflow.com, "Detect if Browser Tab Has Focus," Sep. 2011, 2 pages.
Eric Haines et al., "Occlusion Culling Algorithms," Nov. 1999, 2 pages.
Extended European Search Report for Application No. 12779540.9 dated Sep. 26, 2014.
Extended European Search Report for Application No. 12807022.4 dated Nov. 11, 2014.
Extended European Search Report for Application No. 12831760.9 dated Feb. 17, 2015.
Android Developers, "View," Feb. 16, 2011, 6 pages.
StackOverflow, "How Could I Detect When My Application Is Minizmied?", Feb. 11, 2011, 2 pages.

* cited by examiner

ACCESS TO NETWORK CONTENT

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. The user is typically idle while waiting for their requested site to load. While high-speed Internet access may limit this delay to a few seconds, even this short delay can add up to thousands of man-hours of lost productivity each year.

BRIEF SUMMARY

A method and system for improving access to network content are described.

According to one aspect, a computer-implemented method for accessing web content is provided. The method comprises storing, in a memory, at least one selected uniform resource locator and a set of metadata associated with the at least one selected uniform resource locator. The set of metadata describes a relationship between the selected uniform resource locator and at least one web page, where the relationship is other than a destination address of the at least one selected uniform resource locator. The method further comprises identifying, with a processor, at least one correlation between the set of metadata and a user navigation history; and predicting a likely user navigation event using the identified at least one correlation.

In one example, the set of metadata is selected from the set consisting of a screen location of the selected uniform resource locator, a text string associated with the selected uniform resource locator, a style of text associated with the selected uniform resource locator, and a location of the selected uniform resource locator within a document object model associated with the at least one web page. In another example, the at least one web page comprises a plurality of web pages, where each of the plurality of web pages is associated with the user navigation history.

In one alternative, the at least one web page comprises a plurality of web pages, where each of the plurality of web pages is of a same content type, and the at least one correlation relates to each of the plurality of web pages of the same content type within the user navigation history. In another alternative, the at least one correlation indicates that a user is less likely to select a particular link with a particular metadata value. And in a further alternative, the at least one correlation comprises a correlation across multiple types of metadata.

According to another aspect, a computer-implemented method for accessing web content comprises storing, in a memory, at least one selected link and a relationship of the selected link to a web page from which the selected link was selected; navigating to the web page subsequent to the storing of the at least one selected link and the relationship of the selected link to the web page; identifying a second link associated with the web page, the second link having a destination address different from the selected link and the second link having the same relationship to the web page as the selected link; determining, with a processor, a correlation between the second link and the selected link; and identifying the second link as a likely navigation event based on the determined correlation.

In one example, the method further comprises prerendering the second link. In another example, the relationship is selected from the group consisting of a screen location of the selected link, a text string associated with the selected link, a style of text associated with the selected link, and a location of the selected link within a document object model associated with the at least one web page.

According to another aspect, a non-transitory computer-readable recording medium stores computer-readable instructions. The instructions, when executed by a processor, cause the processor to perform a method for accessing web content. The method comprises storing, in a memory, at least one selected uniform resource locator and a set of metadata associated with the at least one selected uniform resource locator. The set of metadata describes a relationship between the selected uniform resource locator and at least one web page. The relationship is other than a destination address of the at least one selected uniform resource locator. The method further comprises identifying, with a processor, at least one correlation between the set of metadata and a user navigation history; and predicting a likely user navigation event using the identified at least one correlation.

According to a further aspect, anon-transitory computer-readable recording medium is provided that stores computer-readable instructions thereon. The instructions, when executed by a processor, cause the processor to perform a method for accessing web content. The method comprises storing, in a memory, at least one selected link and a relationship of the selected link to a web page from which the selected link was selected; navigating to the web page subsequent to the storing of the at least one selected link and the relationship of the selected link to the web page; identifying a second link associated with the web page, the second link having a destination address different from the selected link and the second link having the same relationship to the web page as the selected link; determining, with a processor, a correlation between the second link and the selected link; and identifying the second link as a likely navigation event based on the determined correlation. In one example, the method further comprises prerendering the second link.

In another aspect, a system is provided that comprises memory storing at least one selected uniform resource locator and a set of metadata associated with the at least one selected uniform resource locator. The set of metadata describes a relationship between the selected uniform resource locator and at least one web page, where the relationship is other than a destination address of the at least one selected uniform resource locator. The system also includes a processor coupled to the memory. The processor is configured to identify at least one correlation between the set of metadata and a user navigation history and to predict a likely user navigation event using the identified at least one correlation.

In one example, the at least one web page comprises a plurality of web pages where each of the plurality of web pages being of a same content type, and the at least one correlation relates to each of the plurality of web pages of the same content type within the user navigation history. In another example, the at least one correlation indicates that a user is less likely to select a particular link with a particular metadata value. And in a further example, the at least one correlation comprises a correlation across multiple types of metadata.

According to yet another aspect, a system is provided that comprises memory storing at least one selected link and a relationship of the selected link to a web page from which the selected link was selected, and a processor coupled to the memory. The processor is configured to navigate to the web page subsequent to the storing of the at least one selected link and the relationship of the selected link to the web page; identify a second link associated with the web page, the second link having a destination address different from the selected link and the second link having the same relationship to the web page as the selected link; determine a correlation between the second link and the selected link; and identify the second link as a likely navigation event based on the determined correlation.

In one example, the processor is further configured to prerender the second link. In another example, the relationship is selected from the group consisting of a screen location of the selected link, a text string associated with the selected link, a style of text associated with the selected link, and a location of the selected link within a document object model associated with the at least one web page.

DETAILED DESCRIPTION

Embodiments of a system and method for improving access to network content are described herein. Aspects of the disclosure minimize the delay between a user's selection of a navigation event and display of the content associated with the navigation event by prerendering content associated with the navigation event prior to the user's selection of the event. For example, the method and system may predict a likely next uniform resource locator during web browsing to preemptively request content from the network before the user selects the corresponding link, thus minimizing the wait time when a user selects a hyperlink on a web page. Various methods for performing the prerendering operation, configuring the prerendering operation, and managing the prerendering operation are described. For the purposes of this application, the term "prerendering" generally refers to the act of requesting all resources (e.g., any executable code, scripting language, files, and/or interactive objects) necessary to load the content of a web address, and loading the content in a web browser instance.

In order to optimize the prerendering process, data, metrics, and indicators may be used to select a particular navigation event for prerendering. For example, aspects of the disclosure may attempt to determine the most likely navigation event based on historical data associated with user browsing habits. One set of metrics that may be useful for predicting a likely navigation event may utilize the relationship of links on a web page to the web page. For example, a user may be more likely to select a link that is at a particular location on a given page (e.g., a top news headline or breaking news alert on a news page), associated with a particular page frame, associated with a particular hypertext markup language (HTML) style, or located at a particular place in a document-object model hierarchy. Methods and systems may also be employed to identify correlations in the relationship of previously selected links to a particular page. For example, there may be a particularly strong correlation between links associated with a "headline" location on a news website, but a weaker correlation between selection of a link in the same style on a business or reference website.

The system can provide privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed. A user may also be provided with an opportunity to opt in/out to enable the collection of sharing of data.

Figure 1:
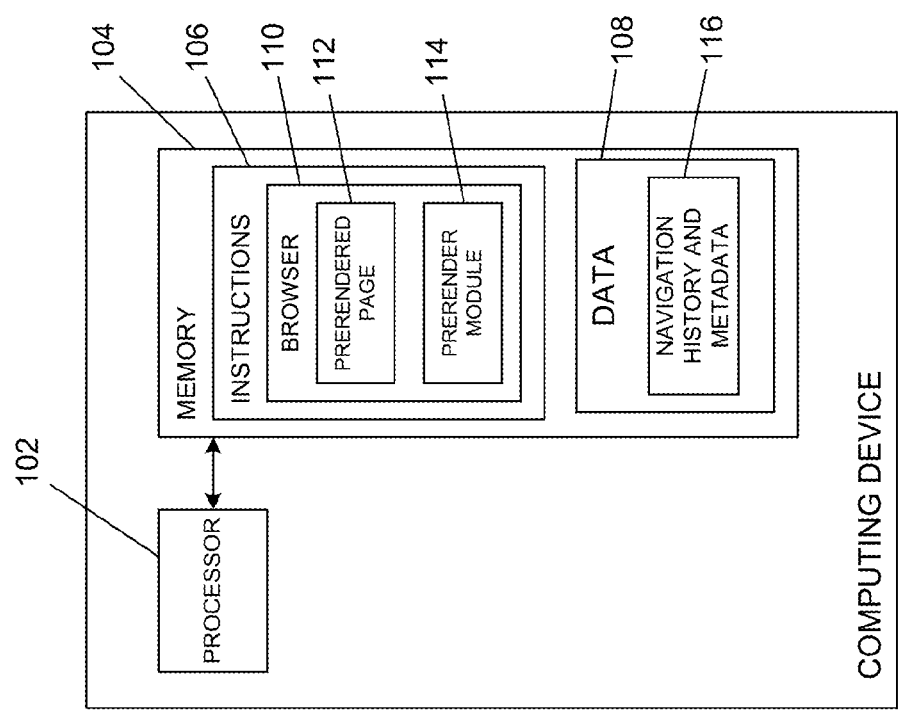
FIG. 1 is block diagram depicting an example of a client device in communication with a server in accordance with aspects of the disclosure.

FIG. 1 is a detailed view of a computing device such as a client 100. The client 100 is operable to use web page relationship information and correlations between certain link metadata to predict a navigation event in accordance with aspects of the disclosure. The client 100 may be operable to request web content from Internet, and to display the web content, such as via a browser 110. The client 100 may be a computing device such as a laptop computer, a desktop computer, a netbook, a rack-mounted server, a smartphone, a cellular phone, a tablet computer, or any other device containing programmable hardware or software for executing instructions. The client 100 may include a processor 102, a memory 104, and other components typically present in general purpose computers. The processor 102 may be any processor capable of execution of computer code. Alternatively, the processor 102 may be a dedicated controller such as an application-specific integrated circuit ("ASIC") or other processing device.

The client 100 may have all of the components normally used in connection with a wireless mobile device such as a central processing unit ("CPU"), memory (e.g., RAM and ROM) storing data and instructions, an electronic display (e.g., a liquid crystal display ("LCD") screen or touch-screen), user input (e.g., a keyboard, touch-screen or microphone), camera, a speaker, a network interface component, and all of the components used for connecting these elements to one another. Some or all of these components may all be internally stored within the same housing, e.g., a housing defined by a plastic shell and LCD screen.

The memory 104 may store information that is accessible by the processor 102, including instructions 106 that may be executed by the processor 102, and data 108. The memory 104 may be of any type of memory operative to store information accessible by the processor 106, including a non-transitory computer-readable medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 106 may be any set of instructions to be executed directly (such as machine code) or indirectly (such as scripts) by the processor 102. For example, the instructions 106 may be stored as computer code on the computer-readable medium. In that regard, the terms "instructions" and "programs" may be used interchangeably herein. The instructions 106 may be stored in object code format for direct processing by the processor 102, or in any other computer language including scripts or collections of independent source code modules that are interpreted on demand or compiled in advance.

The instructions 106 may comprise an application for a web browser 110. The web browser 110 may be operable to display network content, such as web pages, to a user of the client 100. The web browser 110 may perform prerendering functions using a prerender module 114, where content is retrieved and rendered in a hidden browser instance before the user actually selects the network content for display. In this manner, delay in the display of network content may be minimized by performing network and rendering operations in parallel with the user's other browsing activities.

The instructions 106 may include a prerender module 114 for receiving navigation and location history data from the client 100, for predicting a navigation event using information stored in the data 108, such as a navigation history and metadata 116, or for providing the client with the predicted navigation event (e.g., by identifying an embedded prerender tag in content provided by a server).

Portions of the data 108 may comprise the navigation history and metadata 116. The navigation history and metadata 116 may include a set of previously visited navigation events indexed by the web page at which the event occurred. The metadata may include relationship data describing the relationship of the selected link to the page upon which it was selected. The metadata may describe where the particular selected navigation event (e.g., a uniform resource locator (URL)) was found in the page or Document Object Model (DOM) of the page. For example, a particular selected navigation event may be stored with data indicating that the link was at the top of the web page, that the link was associated with a particular text string, that the link was in a particular location in the page DOM (e.g., a particular frame, table, or column), or that the link was in a particular frame location on the web page. The navigation history and metadata 116 may be analyzed to identify correlations for particular web pages. For example, a particular set of page metadata may be more relevant for a news site than a reference page (e.g., breaking news links at the top of a news page may be more likely more likely to be clicked than advertisements at the top of an e-commerce page).

The prerender module 114 may access the navigation history and metadata 116 stored in the data 108 to perform navigation prediction operations. The navigation history and metadata 116 is preferably stored in an anonymous fashion, such that user privacy is preserved. For example, the navigation history and metadata 116 may be stored in an encrypted format. In order to safeguard user privacy, the location and history data may be stored and processed on the computing device 100, without exposing personal user data outside of the client computing device 100.

The browser 110 may further comprise a prerendered web page 112. The prerendered web page 112 represents a web page that was requested and accessed by the browser in response to a predicted navigation event. The prerendered web page 112 may be stored in a hidden rendering environment such that the prerendered web page 112 is not visible to a user until the user selects a navigation link with which the prerendered web page 112 is associated. The hidden rendering environment refers to any representation that does not have an immediately apparent interface for the user. For example, the prerendered web page 112 may be stored within a browser "tab" that does not have an associated selection control in a web browser tab interface. The hidden rendering environment may be accessible via a menu or interface command, and in response to the selection of this interface command an interface for the prerendered content is generated, such as by adding a selection control for the prerendered content to the browser tab interface. The hidden rendering environment may also be provided by a variety of other methods suitable to receive and render the page environment while avoiding distraction of the user with potentially irrelevant content. The prerendered web page 112 may be stored in a completely executed and rendered format. For example, any executable code, scripting language, multimedia files, and/or interactive objects may be fully requested and loaded in the prerendering environment. In the event the user selects the navigation event associated with the prerendered web page 112, the browser 110110 may swap the prerendered web page 112 into an active browser instance, thus providing the content associated with the navigation event without the need to send another network request.

The data 108 may be retrieved, stored or modified by the processor 102 in accordance with the instructions 106. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. In a further example, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

Although FIG. 1 functionally illustrates the processor 102 and memory 104 as being within the same block, the processor 102 and memory 104 may actually comprise multiple processors and memories that may or may not be stored within the same physical housing. Accordingly, references to a processor, computer or memory will be understood to include references to a collection of processors, computers or memories that may or may not operate in parallel.

The computing device 100 may be at a first node of a network (not shown). The computing device 100 may be operative to directly and indirectly communicate with other nodes of the network. For example, the computing device 100 may comprise a mobile device that is operative to communicate with a server (not shown) via the network such that the server uses the network to transmit and display web content to a user via the computing device 100.

The computing device 100 may communicate to other devices in various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and simple mail transfer protocol ("SMTP"), and various combinations of the foregoing. Although only a single client device is depicted in FIG. 1, it should be appreciated that a typical system may include a large number of connected computers.

Although some functions are indicated as taking place on the client 100 and other functions are indicated as taking place on a remote computer various aspects may be implemented by a single computer having a single processor.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

The computing device 100 may be operable to predict navigation events to assist in data access. For example, the client devices may predict a likely navigation event to facilitate prerendering of a web page in order to improve the user's browsing experience. In some aspects, the computing device 100 stores navigation history and metadata 116 which may be used by the client devices 106, 108, 110 to predict a likely navigation event. In some aspects, the computing device 100 predicts a likely navigation event using local data. In some aspects, a likely navigation event is indicated as a HTML tag embedded within a web page.

Figure 2:
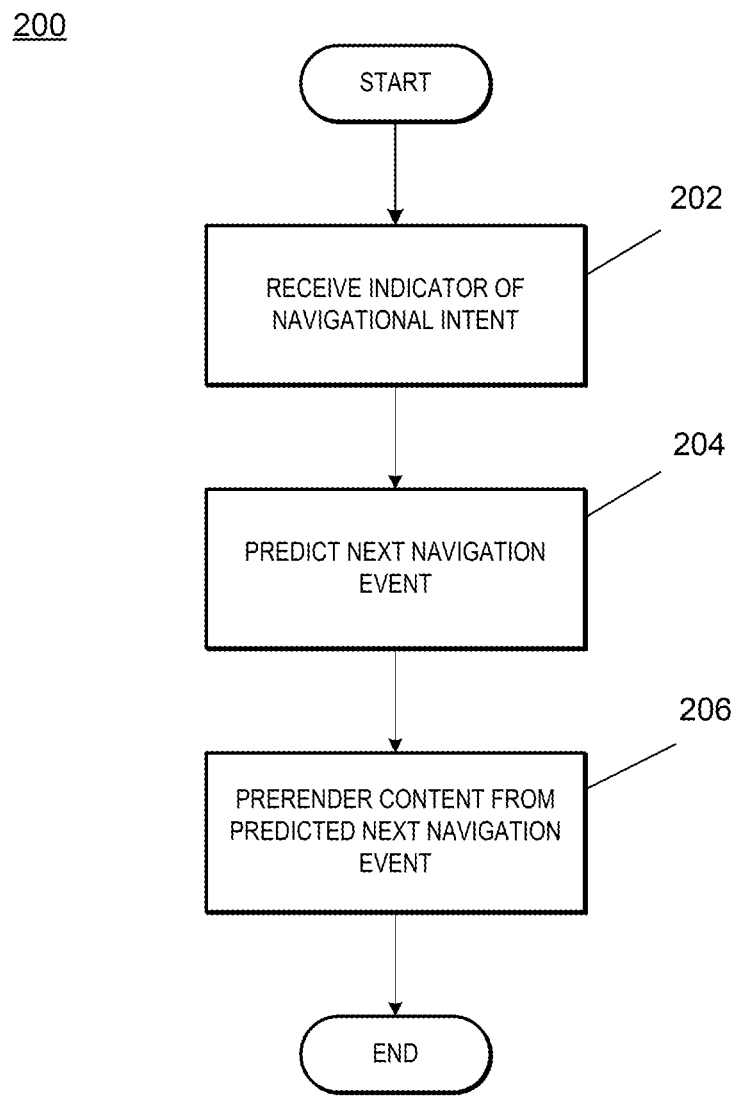
FIG. 2 is a flow diagram depicting an example of a method for prerendering a web page based upon a predicted navigation event in accordance with aspects of the disclosure.

FIG. 2 is a flow diagram depicting an example method 200 for prerendering a web page based upon a predicted navigation event in accordance with aspects of the disclosure. Aspects of the method 200 operate to identify one or more likely navigation destinations from a set of navigation indicators, and then prerender the identified navigation destinations. The method 200 may be performed by a computing device, such as the computing device 100, to eliminate delays in the user web browsing experience by prerendering web pages that are identified as likely navigation targets by the user. For example, the method 200 may be performed by elements of the browser 110. While aspects of the method 200 are described with respect to the computing device 100, the method 200 may also be performed by the server 104, or any device with hardware and/or software designed to accept instructions.

At stage 202, the computing device 100 receives one or more indicators of navigational intent. Navigational intent may be any action that would tend to indicate that the user will generate a particular network request, such as a request for a particular web page. For example, the indicators may provide metrics by which to determine what the particular request will be, such as a confidence value. For example, the user may navigate to a certain web page, from which they generally navigate to another certain web page based upon their browsing history, or the user may move his mouse cursor towards a particular hyperlink embedded within a web page. In some aspects, the indicator is received from a remote server, such as a search engine that embeds an indicator within search results, indicating that most users that submit a particular search query select a particular search result.

At stage 204, after receiving the indicator of navigational intent, the computing device 100 attempts to predict the most likely navigation event. In short, the computing device 100 makes a best guess of to where the user is likely to navigate next, based upon the indicator. Methods of performing this prediction are described below (see FIGS. 4-12).

At stage 206, the computing device 100 prerenders the content from the predicted next navigation event as determined at stage 204. The prerendering process may include storing a prerendered web page within a browser, such as the prerendered web page 115. The computing device 100 may prerender a single web page predicted as the most likely navigation event, or the computing device 100 may prerender multiple pages. In some aspects, the computing device 100 determines the number of pages to prerender based upon one or more system capabilities of the computing device 100, such as available system resources, available network bandwidth, processor speed, installed memory, and the like. In some aspects, the number of pages to prerender may be configurable in one or more user settings. After prerendering the content associated with the navigation event(s), the method 200 ends.

Multiple methods for predicting a next navigation event are provided below. While each method is described separately, it should be appreciated that aspects of the methods may be combined to improve navigation prediction operations.

Figure 3:
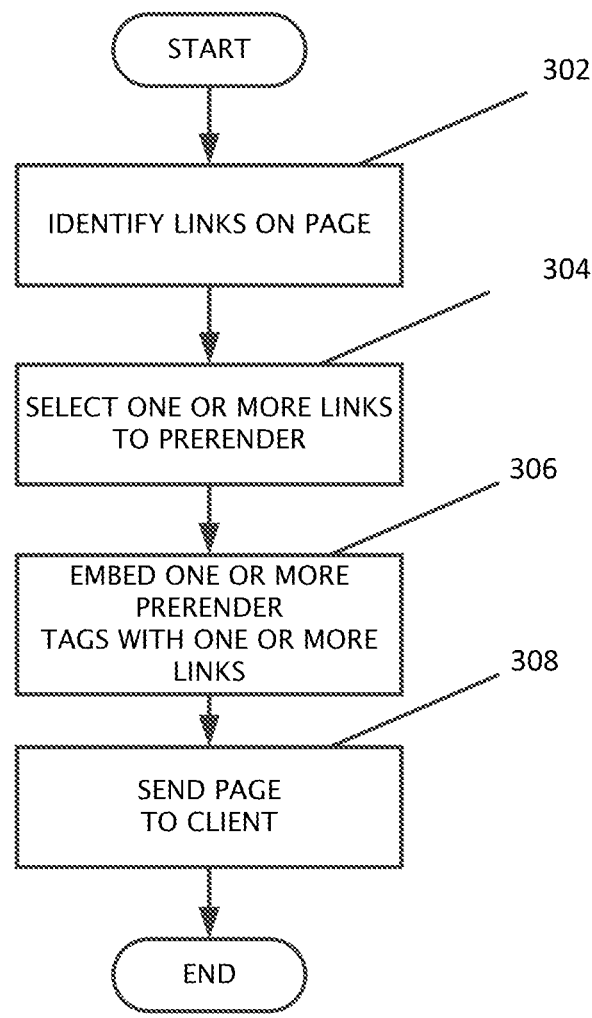
FIG. 3 is a flow diagram depicting an example of a method for indicating a navigation event to prerender in accordance with aspects of the disclosure.

FIG. 3 is a flow diagram depicting an example method 300 for indicating a navigation event to prerender. In some aspects, the server hosting the content, such as the server 104, can specify the navigation event for the web browser to prerender. Allowing the server to specify the prerendered link or links may be optimal for a variety of reasons, such as because the server has the best information on which navigation event is most likely, or because the server wishes to manage bandwidth associated with particular hosted links, such as for load balancing operations. As such, a server may embed a prerender tag or tags within a hosted page, instructing the browser 110 of the computing device 100 in which content to render. Although the method 300 describes a process by which links within a web page are identified as prerender targets, prerender targets may be determined irrespective of links available in the browser interface. For example, prerender targets may be identified from user navigation histories and browsing habits, without the need to examine links on a page visible in the browser.

At stage 302, one or more links are identified within a hosted web page. For example, a list of websites may be generated in response to a query from the computing device 100. Each search result may be associated with a particular link on the page that is to be provided in response to the query.

At stage 304, one or more links are selected to be prerendered, chosen from the links identified at stage 302. The links to prerender may be chosen by a variety of methods for a variety of purposes, such as by examining a user navigation history, an aggregate navigation history, a most relevant link, and the like. In some aspects, the links are chosen by a search engine analyzing the links most frequently clicked in response to a particular query. For example, the search engine may collect "click-through" data indicating which links are clicked on in response to a particular query, and select one or more links to prerender based upon the frequency with which the particular links are selected. To continue the search engine example, the server 104 might identify the top search result, or the top "n" search results as optimal links to prerender. In some aspects, the links may be ranked to identify a ranking of links to prerender, with the most optimal link to prerender being ranked number 1, the next most optimal link being ranked number 2, and so on. A likelihood may be identified that each link will be selected, rather than a rank. For example, it may be indicated that a particular link has a 50% likelihood, a 25% likelihood, or a 80% likelihood of being selected by a user. Prerender operations performed by the client may elect to prerender links associated with a threshold level of likelihood, for example, such as at least 50% likelihood, at least 80% likelihood, or any other threshold value.

At stage 306, prerender tags are embedded with the one or more links identified at stage 304. For example, the a hypertext markup language (HTML) tag may be included in the page for identifying the optimal link or links to prerender. As described above, the prerender tag may also include a ranking value and a TTL value specifying a time to keep the prerender. To continue the search engine example, each search result may be associated with a prerender tag, along with ranking the prerender order of the results by the relevance of the search result.

At stage 308, the page with the embedded prerender tags is sent to the client that requested the page. The method 300 then ends after sending the page.

Figure 4:
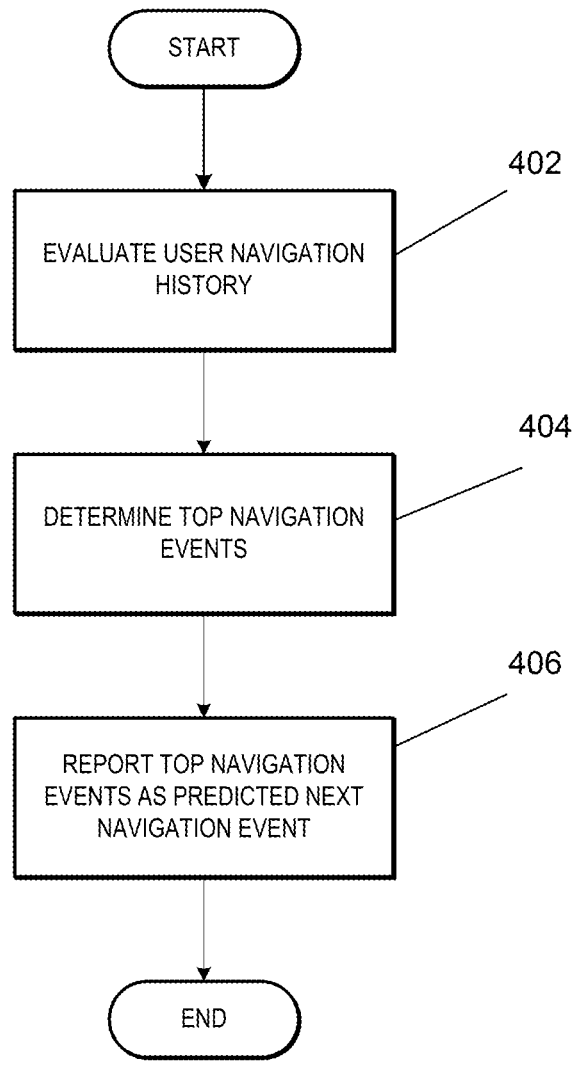
FIG. 4 is a flow diagram depicting an example of a method for predicting a navigation event based on a client navigation history in accordance with aspects of the disclosure.

FIG. 4 is a flow diagram depicting an example method 400 for predicting a navigation event based on a client navigation history in accordance with aspects of the disclosure. The method 400 provides for storing a navigation history for a user, and predicting a next navigation event based upon a navigation history of a particular user. As above, the method 400 may be performed by a computing device such as the computing device 100. In particular, the method 400 may be performed by a browser executing on a processor, such as the browser 110.

At stage 402, the computing device 100 tracks a user's navigation history. For example, the computing device 100 may store records of web pages visited by the user, such as the browsing history commonly maintained in web browsers. The browsing history may comprise the URLs of the web pages visited by the user, the order in which the URLs were visited, and the manner in which the user selected the URL (e.g., whether the URL was a clicked hyperlink, typed into an address bar, a redirect operation from another web page, etc.).

At stage 404, the computing device 100 determines a most likely navigation event or events based upon the user navigation history. The most likely navigation events may be determined by identifying the globally most visited pages for the user, or the navigation events may be associated with one or more current criteria. For example, the computing device 100 may examine the user's navigation history to determine that, when the user is viewing a particular news web page, they almost always select a link to the top news story on that page, or that when the user first opens the browser in the morning, they are likely to navigate to their bank account page to check their daily balance. The computing device 100 may employ various rules, heuristics, and filters to determine the most likely navigation event from the user history. The computing device 100 may associate each navigation event with a particular confidence value, indicating the likelihood that the user will select each navigation event. These confidence values may then be used to sort the navigation events to determine the most likely navigation event. A method to determine a confidence value for a given navigation event is described further below (see FIG. 5).

At stage 406, the computing device 100 reports the most likely navigation event as the predicted navigation event. For example, these predicted most likely navigation event may then be employed by the method described above (see FIG. 2) to facilitate prerendering of the web pages associated with the most likely navigation event.

Figure 5:
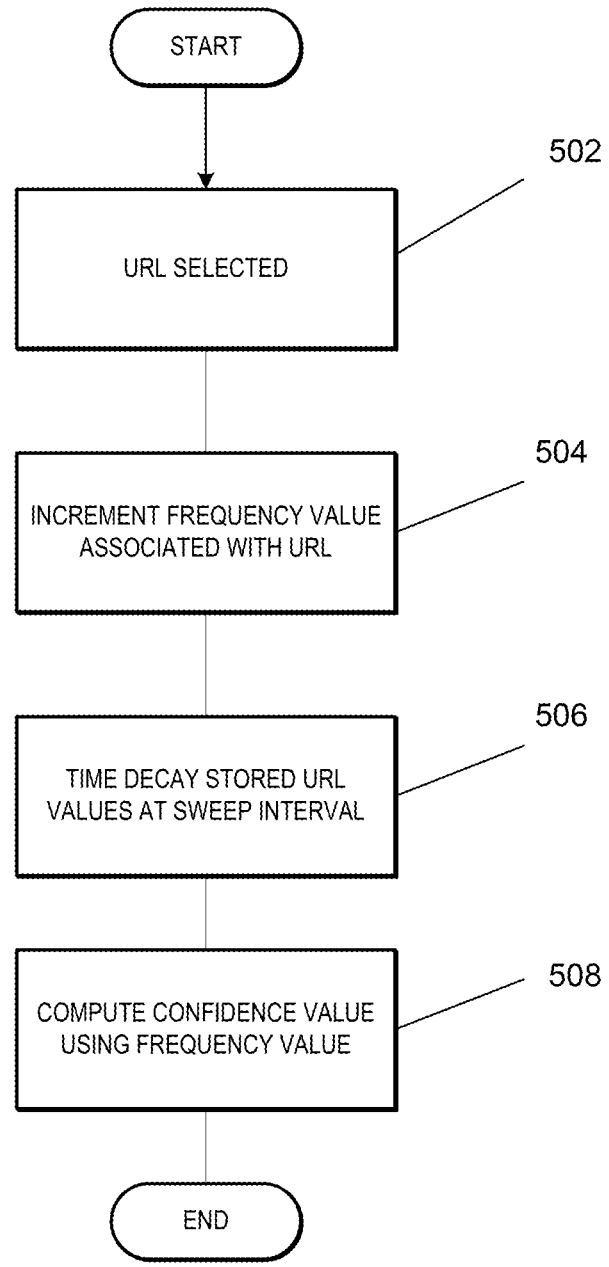
FIG. 5 is a flow diagram depicting an example of a method for computing a confidence value for a URL using a client navigation history in accordance with aspects of the disclosure.

FIG. 5 is a flow diagram depicting an example method 500 for computing a confidence value for a URL using a user navigation history in accordance with aspects of the disclosure. The method 500 is operable to track navigation events input by the user and to maintain a frequency value for each stored event. The method 500 may be employed to build a client navigation history as used by the method 400, and stored on the computing device 100.

At stage 502, the computing device 100 tracks the selection of a particular URL. For example, the user may type a URL for a news site into the browser, or click a link on a page. The computing device 100 may monitor the navigation events using functionality built into the browser 110, through a browser extension such as a plug-in or toolbar, or via a third party application executing in tandem with the browser.

At stage 504, the computing device 100 increments a frequency value associated with the URL selected at stage 502. For example, the computing device 100 may track a frequency value associated with each URL selected by a user. The frequency value is a data metric used to rank a number of visits to a particular web site or the number of times a particular navigation event is selected. In response to a selection operation, the computing device 100 may increment the frequency value associated with the URL, for example by 1.0, 5.0, 10.0, 0.5, or any other value. The frequency value associated with the URL represents how often the user has selected the particular URL, and thus is an indicator of how likely the user is to select the URL in the future.

At stage 506, the computing device 100 time decays the stored frequency values for the URLs after a given "sweep interval". Decaying the URL frequency values in this manner allows for current browsing habits to be more heavily weighted than previous browsing habits. As an example, the computing device 100 may execute the sweep every 30 seconds, every minute, or every 5 minutes during which the user has selected at least one URL. The sweep interval may be conducted in response to the selection of at least one URL during a particular sweep interval to ensure that the navigation history values are not decayed below a threshold value during periods where the user is inactive. The sweep may decay the stored frequency value associated with the URL by a particular value, such as 0.99, 0.5, or 1.0, or by a percentage value, such as 5%, 10%, or 50%. Once the value associated with the URL drops below a given threshold, for example, 0.3, 1.0, or 5.0, the URL may be removed from the list of possible navigation destinations to avoid the list growing too large. After conducting the decay process, the frequency values for the URLs may be persisted to a local storage on the computing device 100, or sent to a remote storage.

At stage 508, the stored frequency values may be used to determine the relative frequency with which the user visits particular web sites. The frequency value thus provides a basis from which a confidence value associated with a navigation event leading to each web site may be derived. In some aspects, the frequency value itself may be provided as the confidence value. In some aspects, the confidence value is determined by comparing a frequency value for a particular web page with the entire user navigation history. For example, the navigation event with the higher frequency value may be associated with a particular percentage confidence value, the second highest frequency value a lower percentage, and the like. In some aspects, the confidence value is determined by frequency value by the total number of logged navigation events. For example, the frequency value of a particular URL may be divided by the sum of all frequency values to determine a confidence value.

For example, a user may be in the process of buying a home, and thus regularly checking financial and banking websites for mortgage rates. During this time, these financial and banking sites would have high values and thus be more likely to be prerendered, thus improving the user experience while searching for a mortgage rate. After completing the home purchase process, the user is likely to lose interest in day to day rate fluctuations, and thus it is no longer optimal to prerender these websites, since the user is unlikely to visit them. As such, providing for a time decay value allows these sites to fall off of the list over time.

Figure 6:
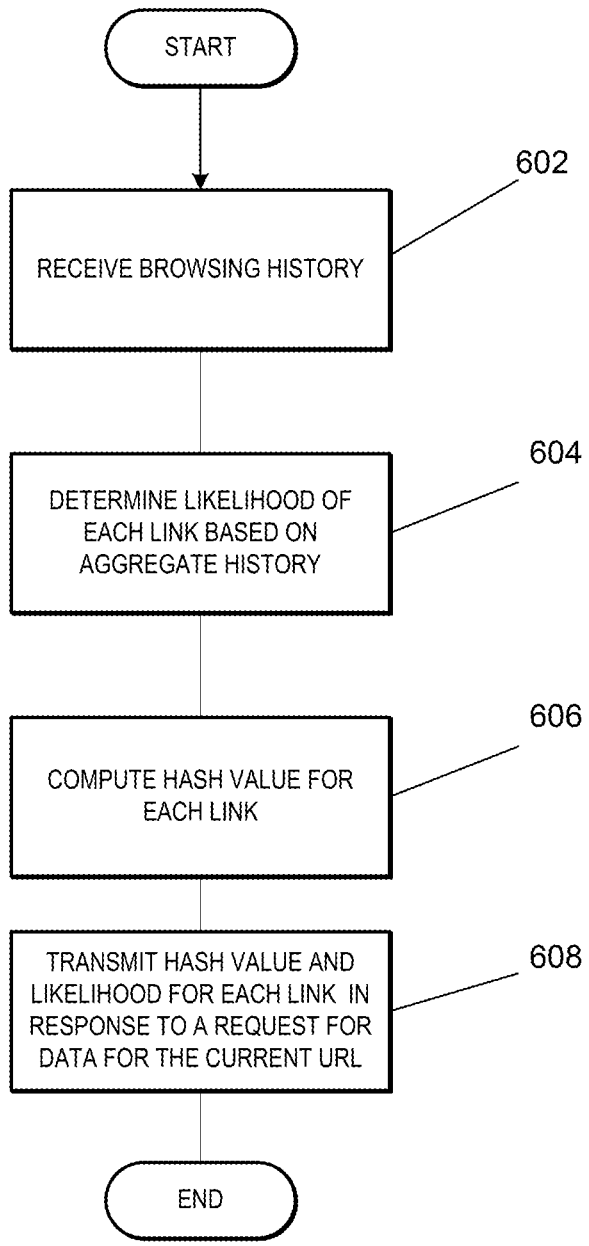
FIG. 6 is a flow diagram depicting an example of a method for predicting a navigation event based on an aggregate navigation history in accordance with aspects of the disclosure.

FIG. 6 is a flow diagram depicting an example method 600 for predicting a navigation event based on an aggregate navigation history in accordance with aspects of the disclosure. The method 600 is operable to track navigation events voluntarily submitted by users to determine likely navigation patterns. The navigation patterns are then analyzed and supplied to the user to facilitate navigation event prediction during the browsing process. For example, a server, may send updates to a computing device, such as the computing device 100, as the user browses to different pages, to provide information on which link displayed on a given page is most likely to be selected based on the aggregate navigation history. In some aspects, the navigation history may include location data, as described below (see FIGS. 8-10).

At stage 602, a set of navigation information comprising a browsing history is received by a computing device, such as the computing device 100. The browsing history is preferably provided by using an "opt-in/out" method, where the user specifically enables (or disables) reporting functionality to provide elements of their browsing history to the computing device 100. In addition, personally identifying data can be anonymized and aggregated before it is stored or used, such that no personal information is stored or accessible. A browsing history may be tracked and provided to the computing device 100 via a browser plug-in or toolbar installed on the user's computing device which tracks the user's browsing history, or by the web browser itself. The browsing history may be combined with other received browsing histories to create a set of aggregate data used in a similar manner as the client navigation history described with respect to FIG. 4, to predict a likely navigation event. The received navigation history may be anonymized to remove any personally identifying information. In some aspects, the received navigation history is received with individual URLs and/or transitional URL pairs provided in a hashed data format to remove any personally identifying information.

At stage 604, the computing device 100 determines a confidence value for each URL on a particular web page, based on the navigation information received at stage 602. For example, the server may employ a method similar to that disclosed above with respect to FIG. 5 for generating confidence values for URLs on a page, except the navigation events are determined based upon aggregated data instead of specific user data. As above, the computing device 100 may compute confidence values based upon the frequency values derived from the navigation information. In some aspects, confidence values are determined by the percentage of the time that users selected a particular navigation event when they were presented with the choice to select the particular navigation event. The transitional URL pairs provide for the determination of a confidence value by dividing a frequency value of a source/destination URL pair by a total number of appearances of the source URL. In some aspects, the server may determine navigation events based upon transitions from a first page to a second page, rather than from a pure visit frequency metric. The computing device 100 may maintain an index of web pages and associated URLs and confidence values for each link on the web page, such as in a database. For example, a news site may have five URLs pointing to different news stories. The computing device 100 may receive aggregate data indicating that one of the five news stories is selected 60% of the time, with the other four being selected 10% of the time each. As such, the computing device 100 would index the page in a database with a 60% likelihood for the first story link, and 10% likelihoods for each of the other four story links.

In some aspects, the computing device 100 maintains history data in a confidential manner, such as by converting each URL to a hash value at stage 606. In this manner, the computing device 100 may provide predicted URL data to a client device without disclosing any personal user data. For example, a user may visit a banking web page that has a particular user name and password login. Depending upon the user, the banking web page may provide URLs to each account the user possesses. Each user accessing the page may have a different set of links provided, depending upon the accounts the user has with the bank. By converting the links on the page to non-reversible hash values, the computing device 100 may provide confidence values that are not associable to links on the page unless the user also possesses access to the same links (e.g., the client can apply the hash function to links they already possess on the currently viewed page to determine if the confidence values apply). As described above, in some aspects, the hash value is computed by the computing device 100 prior to sending navigation history data to the server 104. In this manner, the computing device 100 may receive the navigation history data in the hashed format, without the need to compute a hash value.

At stage 608, the computing device 100 may transmits the hash values and confidence values associated with the hash values to another device. The transmittal may be in response to a request from the computing device 100 for a particular URL. In some aspects, the computing device 100 may transmit the hash values and confidence values in response to a request for such values from a service executing on the computing device 100. For example, when the computing device 100 requests the news web page described above, the computing device 100 may provide the hash values and confidence values for the five story links present on that page. The computing device 100 may also request data for particular link hash values by first generating a hash value on the client side, then requesting a confidence value for the particular hash value.

Figure 7:
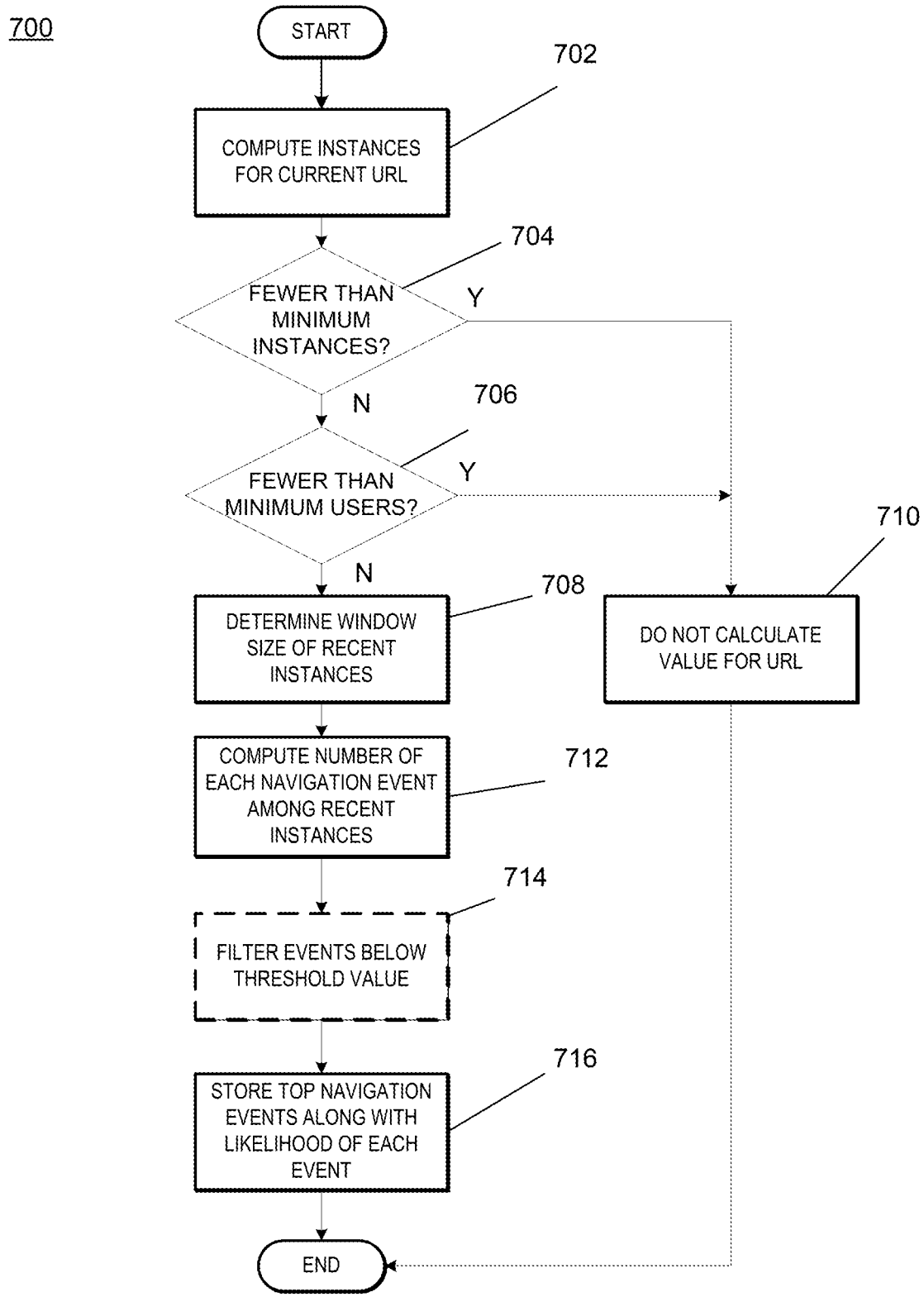
FIG. 7 is a flow diagram depicting an example of a method for computing a confidence value for a URL using an aggregate navigation history in accordance with aspects of the disclosure.

FIG. 7 is a flow diagram depicting an example method 700 for computing a confidence value for navigation events associated with a URL using an aggregate navigation history in accordance with aspects of the disclosure. The method 700 serves to compare navigation events from a given URL received from a plurality of users, in order to determine how likely each individual navigation event is. The confidence values may be determined in relation to a particular "source" web page, with different confidence values for each URL depending upon the page the user is currently viewing. For example, the confidence values may be used above as described with respect to stage 604 of the method 600 (see FIG. 6). Although the method 700 is described using the server 104 as an example, the method 700 (as with other methods in this disclosure) may also be performed by the client 102 to identify prerendering targets.

At stage 702, the computing device 100 examines received browsing histories and computes a number of instances for each navigation event as associated with a particular URL. As described above, the instance value may be a percentage or a raw number.

At stage 704, the computing device 100 may determine if the number of visits to the URL exceeds a minimum threshold of statistical significance. For example, five visits to a particular URL may not provide statistically significant data sufficient to reasonably predict a likely navigation event away from the URL. For example, if the number of instances of the event is less than 1000, the computing device 100 may proceed to stage 710, and not calculate a probability for the event because the sample size is insufficient.

At stage 706, the computing device 100 may determine if a minimum number of users have submitted data regarding the URL to provide statistically significant data. For example, the method 700 may require that at least 50 users have provided data in order to compute and store a confidence value for the navigation event. Otherwise the method 700 may proceed to stage 710 and disregard the event until a sufficient number of users have provided data. As above, the threshold value may fluctuate depending upon the size of the dataset.

At stage 708, the computing device 100 determines a window size of recent instances. The window size refers to the number of latest visits to the URL that will be examined to determine the confidence value, or a length of time to search back through the instances. The window size may be determined based on the amount of traffic the URL receives, how often the content of the URL changes. For example, a news website that has constantly changing content might require a small instance window, because links from the regularly changing URL would grow stale. A website with a small amount of traffic would typically require a longer window size in order to gather enough results for statistical significance. The window size might be set at 50 instances, 100 instances, 1000 instances, all instances within the last hour, within the last day, within the last week, or the like.

At stage 712, the computing device 100 computes the number of times each particular navigation event, such as the next URL visited for the current URL, occurs within the instances defined by the window size determined at stage 710. For example, out of 1000 visits to a news website, a particular article might be selected 600 times, resulting in a confidence value of 60% for navigating to that article from the URL. While the present example primarily relates to determination of a navigation event based upon a number of accesses as a percentage of total navigation events, additional heuristics may also be used to derive the likely event based upon information supplied by the user, such as the previous navigation event (e.g., the website that led to the currently analyzed URL), the time of day (e.g., users are more likely to check news sites when in the morning when they arrive at work), the user's location (e.g., users in a particular geographic region are likely to check sports scores for local teams), or other demographic information.

At stage 714, the computing device 100 optionally compares the confidence values for the navigations events from the URL with a threshold value. If the confidence values do not meet the threshold value, the computing device 100 may identify a subset of available navigation events, as possible predicted likely navigation events. In this manner the computing device 100 avoids predicting navigation events when the event does not have a statistically significant likelihood of occurring, thus potentially saving bandwidth on prerender operations on pages that are unlikely to be visited. The threshold may be set at a variety of different values, such as 5%, 25%, 50%, or 75%. In some aspects, the threshold may be dynamically altered based upon the number of navigation links present at the URL, the type of URL, the traffic of the URL, the speed at which content changes at the URL, and the like. If the confidence values do not meet the minimum threshold, the server 104 may filter out the possible events that do not meet the minimum threshold.

If the navigation event or events meet the minimum threshold, or the method 700 does not check for a minimum threshold, the most likely navigation event or events and the likelihood for each event are stored along with the URL at stage 716. The navigation events and confidence values may be supplied in response to a request to the user, such as occurs at stage 608 described with respect to FIG. 6. The method 700 ends after computing and storing the confidence values for the navigation events associated with the URL.

Figure 8:
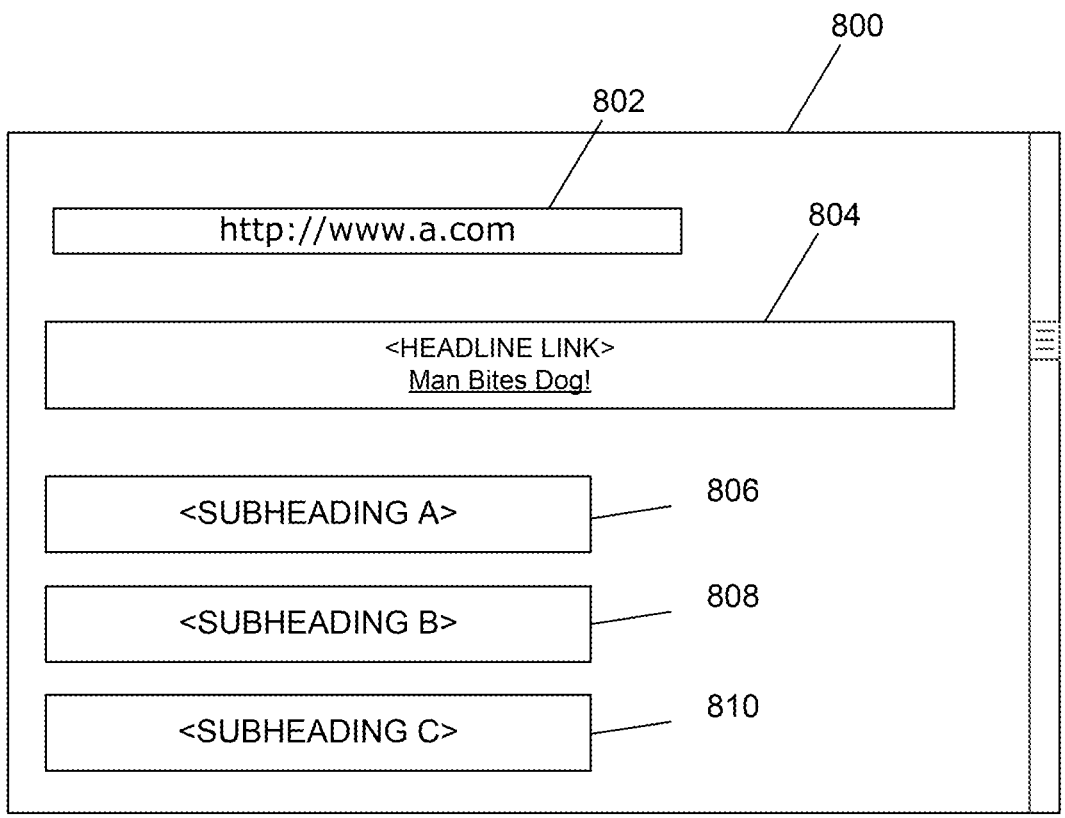
FIG. 8 is an illustration depicting an example of a web page employing a relationship of a page link to a source page to predict a navigation event in accordance with aspects of the disclosure.

FIG. 8 is an illustration depicting an example of a web page 800 rendered in a browser employing a relationship of a page link to a source page to predict a navigation event in accordance with aspects of the disclosure. The depicted web page 800 shows multiple links that are associated with the page www.a.com, as depicted in the address bar 802. In the present example, www.a.com may be assumed to be a news site with a headline link 804 and multiple subheadings, for instance subheading A 806, subheading B 808, and subheading C 810. In the instant example, the headline link 804 is associated with an article entitled "Man Bites Dog!"

In order to instruct the browser to render the web page 800, the page source may identify particular styles, properties, or text to be associated with each of the links 804-810. For example, the headline link 804 may be associated with a "heading" style and placed in a separate frame at the top of the page within the page DOM, and the subheadings 806, 808, 810 may be assigned to a "subheading" style and placed in a separate frame from the headline link 804.

Upon selection of one of the links 804-810, the computing device 100 may store information describing the relationship of the selected page to the selected link. For example, if the headline link 804 is selected, the link may be stored along with data indicating the link's place in the page DOM, the style associated with the link, text associated with the link, or the physical location on the web page.

Figure 9:
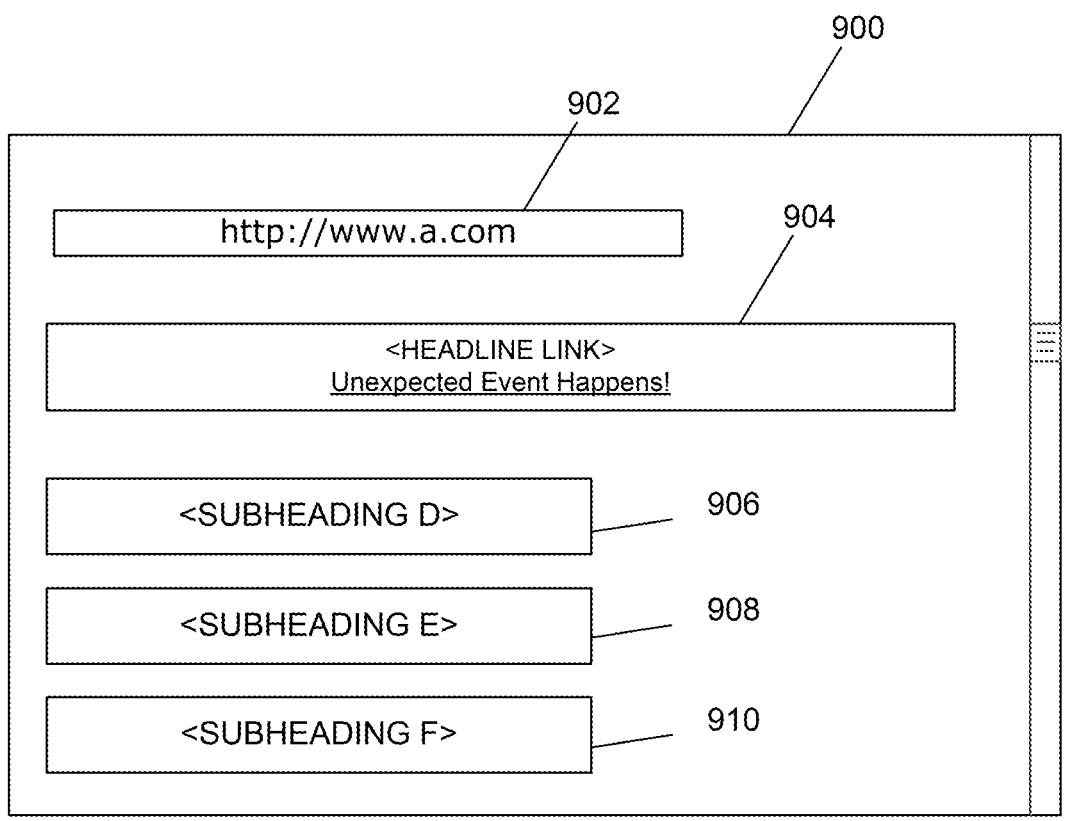
FIG. 9 is an illustration depicting another example of a web page employing a relationship of a page link to a source page to predict a navigation event in accordance with aspects of the disclosure.

FIG. 9 is an illustration depicting another example of a web page 900 rendered in a browser employing a relationship of a page link to a source page to predict a navigation event in accordance with aspects of the disclosure. The web page 900 depicts another rendering of the site associated with the address www.a.com, as depicted in the browser address bar 902.

The web page 900 is associated with a different set of links than the web page 800. This represents how links on a page may change over time. For example, news sites typically update their headline articles multiple times in a given day. In systems and methods where only destination URLs or source/destination pairs of URLs are tracked, repeated browsing of such sites might not provide useful data for predicting navigation events, as the destination URLs stored as part of the navigation history would constantly change as the articles displayed on the main news sites changed.

The web page 900 depicts a headline link 904 associated with an article "Unexpected Event Happens!" and a set of subheading links subheading D 906, subheading E 908, and subheading F 910. These links may be associated with different destination URLs than the links depicted with respect to FIG. 8, but a user may still be likely to be attracted to the same link. As such, if the user has established that they tend to select a link in a headline position when visiting www.a.com, the headline link 904 may be identified as a predicted link for prerendering purposes. Similarly, if the user has established a history of selecting one or more links in the subheading positions, this may be indicative that one of these subheading links is a good target for prerendering. Other methods may also be employed for selection of a link. For example, a user may have established a history of selecting links that include the text term "Giraffe" in a field associated with each link. As such, if one of the articles relates to a story about giraffes, and has the "Giraffe" text in the text associated with the URL, then that link might be identified as a good candidate for prerendering. A method for identifying a correlation between data associated with a link (hereafter, link metadata) is described further below (see FIG. 10).

Figure 10:
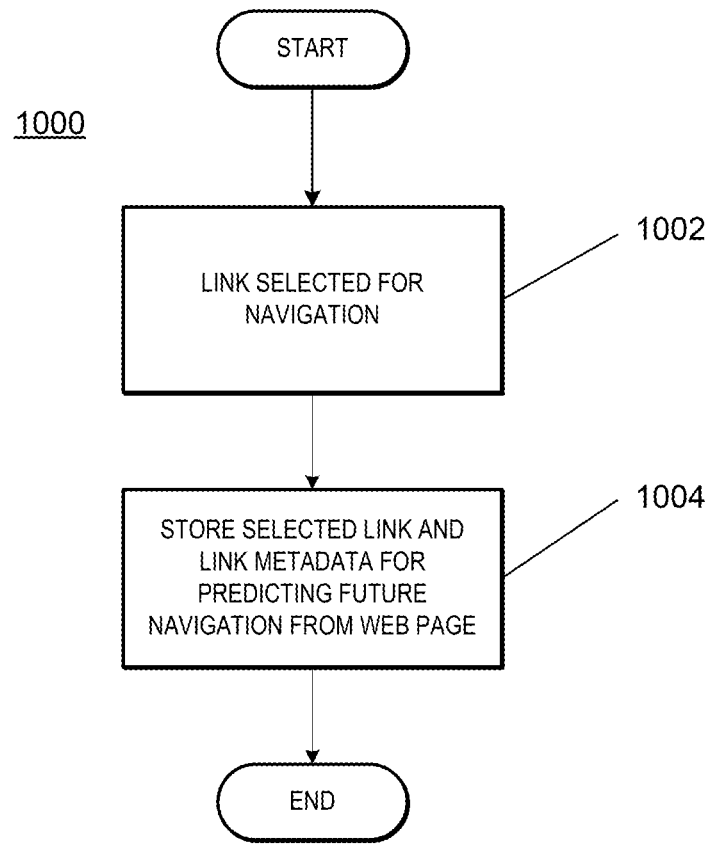
FIG. 10 is a flow diagram depicting an example of a method for gathering data to identify correlations between a web pages and link metadata in accordance with aspects of the disclosure.

FIG. 10 is a flow diagram depicting an example of a method 1000 for gathering data to identify correlations between a web page and link metadata in accordance with aspects of the disclosure. The method 1000 allows for metadata associated with links selected by the user to be stored so that said metadata may be used in link prediction operations associated with the same source web page.

At action 1002, a link is selected for navigation. For example, a user may select a hyperlink from the web page to indicate that the user wishes to view the page associated with the hyperlink.

At action 1004, metadata associated with the selected link is stored for use in prediction operations. As described above, the stored metadata may include information other than the destination address of the link. For example, the metadata may include one or more of text associated with the display of the link, a coordinate location of the link within the page, one or more fonts or styles associated with the selected link, the location of the link within the page DOM hierarchy, or any other data describing the relationship of the selected link to the web page. The stored metadata may then be used to identify correlations between user behavior and the relationship of the selected link to the web page for prediction of navigation events.

Data other than metadata for the specific link may also be stored upon selection of a navigation event. For example, data describing unselected links may be stored as relevant to identification of negative correlations for other links on the page.

Figure 11:
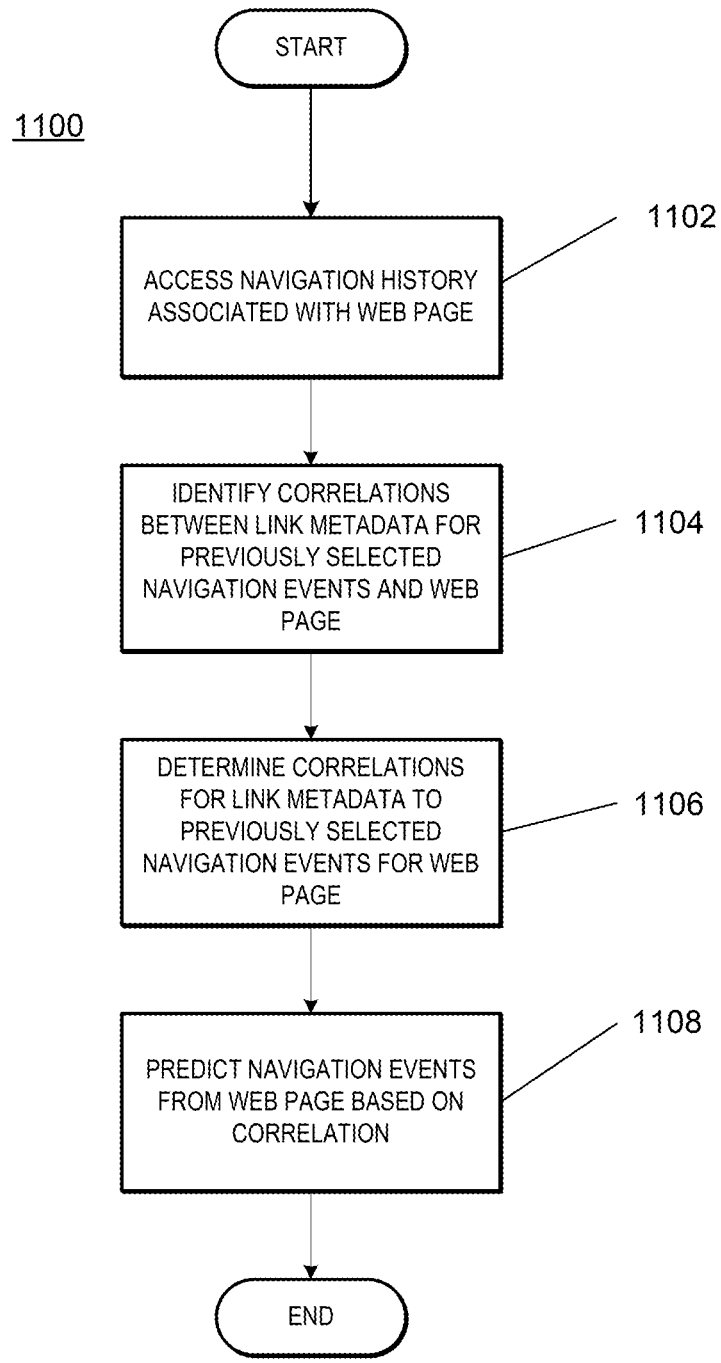
FIG. 11 is a flow diagram depicting an example of a method for predicting next navigation events using correlations between a web page and link metadata in accordance with aspects of the disclosure.

FIG. 11 is a flow diagram depicting an example of a method 1100 for predicting next navigation events using correlations between a web page and link metadata in accordance with aspects of the disclosure. As described above (see FIGS. 8-10), metadata for previously selected links may be stored along with data indicating which link was selected. This metadata may be analyzed to identify correlations between link metadata and a given web page or web pages. For example, as described above (see FIGS. 8-9), a user may typically select a link associated with a headline of a news page. However, due to the constantly changing nature of news pages, correlation based on destination URL alone may be insufficient to accurately predict user navigation events, since the destination URLs of two headline articles are likely different. As such, it is desirable to identify correlations between navigation behavior using alternative data associated with a navigation history.

At action 1102, a navigation history associated with a particular web page may be accessed. The particular web page may be associated with a web page that a user is currently viewing, for the purpose of predicting the navigation event the user is likely to select. Alternatively, the particular web page may be analyzed as part of an "offline" process whereby data is correlated and processed separate from browsing activities.

The navigation history may be a set of data stored in a navigation history and metadata 116 structure as described above (see FIG. 1). Such a data structure may be indexed by source web page, or correlations may be drawn across data collected for all possible source web pages, or all pages of a particular type (e.g., news pages, blogs, or reference pages). Although the instant example is described with respect to data for a particular page, the same techniques apply to identifying correlations across all pages in aggregate or across pages of a particular content type.

At action 1104, correlations may be identified between link metadata and navigation events associated with the page or pages. Different types of metadata may be examined to identify which metadata characteristics appear most frequently in the navigation history associated with the page or pages. For example, a majority of the particular navigation events associated with a news page may have metadata that indicates the selected link was displayed in a headline style or had the text "Giraffe" in text associated with the link. Correlations may be identified across sets of metadata as well. For example, a user may have established browsing habits whereby they frequently select links associated with the text "Zebra", but only when those links appear in a subheadline style. Negative correlations may also be identified. For example, users may be much less likely to select a link that appears in a frame marked "advertisement" or when the link is located in a lower frame or table of the page DOM.

At action 1106, the strongest correlation or correlations among the link metadata are identified to be used in navigation prediction operations. Where the method 1100 is performed as an offline process, this correlation data may be stored in the navigation history data structure to be associated with a particular page, a particular type of page, or all pages in aggregate for future reference. As described above with respect to action 1104, negative correlations (e.g., a user is much less likely to select a link with a particular characteristic) may also be identified and stored.

At action 1108, the determined correlations are used to predict navigation events that are most likely to occur. The correlations may be used to determine navigation events from the same page from which the navigation history is derived, or from other subsets, combinations, and/or aggregations of pages. The stages of the illustrated methods are not intended to be limiting. The functionality of the methods can exist in a fewer or greater number of stages than what is shown and, even with the depicted methods, the particular order of events may be different from what is shown in the figures.

It can be seen that according to one aspect, URLs may be reinterpreted as a function of the web page they are contained in, and the location in which they appear. Although different URLs may be presented at different points in time on the same web page, each of them may be resolved into an identical logical transition. For instance, the top news story on a web page may change daily, hourly, etc. Thus, one news story may have a transition of www.a.com/->www.a.com/politics/Primaries, while another such news story may have a transition of www.a.com/->www.a.com/politics/Protest. A more beneficial representation for both stories could be www.a.com/->LINK_ON_PAGE_AT_POSITION ("www.a.com/", 30, 120). Here, both examples resolve into the same transition, which may be done by determining correlations for link metadata associated with the URLs. This allows the system to better generalize and predict user behavior, thereby allowing the system to perform prerendering of webpages with higher coverage and higher accuracy than before.

The systems and methods described herein advantageously provide for an improved browsing experience. By prerendering the next navigation event, the system and methods minimize the amount of time users wait for network content to load. By analyzing link metadata and identifying correlations therein, links may be predicted even where user data regarding specific destination URLs is not present. Page location, DOM position, and URL text matching provides additional metrics to improve prerendering accuracy and coverage, thereby providing time savings to the user while minimizing wasted system resources on prerendering target links that the user does not select.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for accessing web content, the method comprising:
   storing, in a memory, at least one selected uniform resource locator and a set of metadata associated with the at least one selected uniform resource locator, the set of metadata describing a relationship between the selected uniform resource locator and at least one web page, the relationship being other than a destination address of the at least one selected uniform resource locator, and the set of metadata comprising at least one of a screen location of the selected uniform resource locator, a style of text associated with the selected uniform resource locator, or a location of the selected uniform resource locator within a document object model associated with the at least one web page;
   identifying, with a processor, at least one correlation between the set of metadata and a user navigation history;
   predicting, using the processor, a likely user navigation event using the identified at least one correlation; and
   prerendering, using the processor, content related to the likely user navigation event prior to a user selection of the likely user navigation event.

2. The method of claim 1, wherein the at least one web page comprises a plurality of web pages, each of the plurality of web pages being associated with the user navigation history.

3. The method of claim 1, wherein:
   the at least one web page comprises a plurality of web pages, each of the plurality of web pages being of a same content type; and
   the at least one correlation relates to each of the plurality of web pages of the same content type within the user navigation history.

4. The method of claim 1, wherein the at least one correlation indicates that a user is less likely to select a particular link with a particular metadata value.

5. The method of claim 1, wherein the at least one correlation comprises a correlation across multiple types of metadata.

6. A computer-implemented method for accessing web content, the method comprising:
   storing, in a memory, at least one selected link and a relationship of the selected link to a web page from which the selected link was selected, the relationship comprising at least one of a screen location of the selected link, a style of text associated with the selected link, or a location of the selected link within a document object model associated with the at least one web page;
   navigating to the web page subsequent to the storing of the at least one selected link and the relationship of the selected link to the web page;
   identifying a second link associated with the web page, the second link having a destination address different from the selected link and the second link having the same relationship to the web page as the selected link;
   determining, with a processor, a correlation between the second link and the selected link;
   identifying, using the processor, the second link as a likely navigation event based on the determined correlation; and
   prerendering, using the processor, content related to the second link prior to a user selection of the likely navigation event.

7. A non-transitory computer-readable recording medium on which computer-readable instructions are stored, the instructions, when executed by a processor, cause the processor to perform a method for accessing web content, the method comprising:
   storing, in a memory, at least one selected uniform resource locator and a set of metadata associated with the at least one selected uniform resource locator, the set of metadata describing a relationship between the selected uniform resource locator and at least one web page, the relationship being other than a destination address of the at least one selected uniform resource locator, and the set of metadata comprising at least one of a screen location of the selected uniform resource locator, a style of text associated with the selected uniform resource locator, or a location of the selected uniform resource locator within a document object model associated with the at least one web page;
   identifying, with a processor, at least one correlation between the set of metadata and a user navigation history;
   predicting, using the processor, a likely user navigation event using the identified at least one correlation; and
   prerendering, using the processor, content related to the likely user navigation event prior to a user selection of the likely user navigation event.

8. A non-transitory computer-readable recording medium on which computer-readable instructions are stored, the instructions, when executed by a processor, cause the processor to perform a method for accessing web content, the method comprising:
   storing, in a memory, at least one selected link and a relationship of the selected link to a web page from which the selected link was selected, the relationship comprising at least one of a screen location of the selected link, a style of text associated with the selected link, or a location of the selected link within a document object model associated with the at least one web page;

navigating to the web page subsequent to the storing of the at least one selected link and the relationship of the selected link to the web page;

identifying a second link associated with the web page, the second link having a destination address different from the selected link and the second link having the same relationship to the web page as the selected link;

determining, with a processor, a correlation between the second link and the selected link;

identifying, using the processor, the second link as a likely navigation event based on the determined correlation; and prerendering, using the processor, content related to the second link prior to a user selection of the likely navigation event.

9. A system, comprising:

memory storing at least one selected uniform resource locator and a set of metadata associated with the at least one selected uniform resource locator, the set of metadata describing a relationship between the selected uniform resource locator and at least one web page, the relationship being other than a destination address of the at least one selected uniform resource locator, and the set of metadata comprising at least one of a screen location of the selected uniform resource locator, a style of text associated with the selected uniform resource locator, or a location of the selected uniform resource locator within a document object model associated with the at least one web page;

a processor coupled to the memory, the processor being configured to:

identify at least one correlation between the set of metadata and a user navigation history, predict a likely user navigation event using the identified at least one correlation, and prerender content related to the likely user navigation event prior to a user selection of the likely user navigation event.

10. The system of claim 9, wherein:

the at least one web page comprises a plurality of web pages, each of the plurality of web pages being of a same content type; and the at least one correlation relates to each of the plurality of web pages of the same content type within the user navigation history.

11. The system of claim 9, wherein the at least one correlation indicates that a user is less likely to select a particular link with a particular metadata value.

12. The system of claim 9, wherein the at least one correlation comprises a correlation across multiple types of metadata.

13. A system, comprising:

memory storing at least one selected link and a relationship of the selected link to a web page from which the selected link was selected, the relationship comprising at least one of a screen location of the selected link, a style of text associated with the selected link, or a location of the selected link within a document object model associated with the at least one web page;

a processor coupled to the memory, the processor being configured to:

navigate to the web page subsequent to the storing of the at least one selected link and the relationship of the selected link to the web page;

identify a second link associated with the web page, the second link having a destination address different from the selected link and the second link having the same relationship to the web page as the selected link;

determine a correlation between the second link and the selected link;

identify the second link as a likely navigation event based on the determined correlation; and prerender content related to the second link prior to a user selection of the likely navigation event.

* * * * *